(12) United States Patent
Vank et al.

(10) Patent No.: US 10,110,638 B2
(45) Date of Patent: *Oct. 23, 2018

(54) ENABLING DYNAMIC AUTHENTICATION WITH DIFFERENT PROTOCOLS ON THE SAME PORT FOR A SWITCH

(71) Applicant: McAfee, LLC, Santa Clara, CA (US)

(72) Inventors: Alexandru Z. Vank, Bellevue, WA (US); Xin Shen, Mercer Island, WA (US); Matt B. Cobb, Redmond, WA (US); Brad Robel-Forrest, North Bend, WA (US); Evan M. Phoenix, Seattle, WA (US)

(73) Assignee: McAfee, LLC, Santa Clara, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/186,084

(22) Filed: Jun. 17, 2016

(65) Prior Publication Data
US 2017/0019427 A1 Jan. 19, 2017

Related U.S. Application Data

(63) Continuation of application No. 13/952,245, filed on Jul. 26, 2013, now Pat. No. 9,374,353, which is a
(Continued)

(51) Int. Cl.
*H04L 29/06* (2006.01)

(52) U.S. Cl.
CPC ............ *H04L 63/205* (2013.01); *H04L 63/08* (2013.01); *H04L 63/10* (2013.01); *H04L 63/162* (2013.01); *H04L 63/20* (2013.01)

(58) Field of Classification Search
None
See application file for complete search history.

(56) References Cited

U.S. PATENT DOCUMENTS

| 5,577,209 A | 11/1996 | Boyle et al. |
| 5,583,848 A | 12/1996 | Glitho et al. |

(Continued)

FOREIGN PATENT DOCUMENTS

| WO | WO 2005/069823 | 8/2005 |
| WO | WO 2006/078729 | 7/2006 |

(Continued)

OTHER PUBLICATIONS

IEEE 802.1X, http://en.wikipedia.org/wiki/802.1x, last modified Nov. 2, 2006, 2 pages.

(Continued)

*Primary Examiner* — Kaveh Abrishamkar
(74) *Attorney, Agent, or Firm* — Patent Capital Group

(57) ABSTRACT

The invention enables a client device that does not support IEEE 802.1X authentication to access at least some resources provided through a switch that supports 802.1X authentication by using dynamic authentication with different protocols. When the client device attempts to join a network, the switch monitors for an 802.1X authentication message from the client device. In one embodiment, if the client fails to send an 802.1X authentication message, respond to an 802.1X request from the switch, or a predefined failure condition is detected the client may be deemed incapable of supporting 802.1X authentication. In one embodiment, the client may be initially placed on a quarantine VLAN after determination that the client fails to perform an 802.1X authentication within a backoff time limit. However, the client may still gain access to resources based on various non-802.1X authentication mechanisms, including name/passwords, digital certificates, or the like.

22 Claims, 5 Drawing Sheets

Related U.S. Application Data continuation of application No. 12/879,319, filed on Sep. 10, 2010, now Pat. No. 8,522,318, which is a continuation of application No. 11/337,408, filed on Jan. 23, 2006, now Pat. No. 7,810,138.

(60) Provisional application No. 60/750,643, filed on Dec. 14, 2005, provisional application No. 60/647,692, filed on Jan. 26, 2005.

(56) References Cited

U.S. PATENT DOCUMENTS

| | | | |
|---|---|---|---|
| 5,987,610 | A | 11/1999 | Franczek et al. |
| 6,035,405 | A | 3/2000 | Gage et al. |
| 6,073,142 | A | 6/2000 | Geiger et al. |
| 6,460,050 | B1 | 10/2002 | Pace et al. |
| 6,487,600 | B1 | 11/2002 | Lynch |
| 7,174,517 | B2 | 2/2007 | Barnett et al. |
| 7,174,566 | B2 | 2/2007 | Yadav |
| 7,284,062 | B2 * | 10/2007 | Krantz .................. H04L 63/08 709/229 |
| 7,310,669 | B2 | 12/2007 | Webb et al. |
| 7,467,405 | B2 | 12/2008 | Cheng |
| 7,469,139 | B2 | 12/2008 | van de Groenendaal |
| 7,505,596 | B2 * | 3/2009 | Duplessis ........... H04L 63/0428 380/270 |
| 7,506,155 | B1 | 3/2009 | Stewart et al. |
| 7,533,407 | B2 | 5/2009 | Lewis |
| 7,617,533 | B1 | 11/2009 | Hernacki |
| 7,770,225 | B2 | 8/2010 | Hammond |
| 7,810,138 | B2 * | 10/2010 | Vank ..................... H04L 63/08 380/270 |
| 8,190,755 | B1 | 5/2012 | Satish et al. |
| 8,520,512 | B2 | 8/2013 | Gilde et al. |
| 8,522,318 | B2 * | 8/2013 | Vank ..................... H04L 63/08 380/270 |
| 8,554,903 | B2 | 10/2013 | Webb et al. |
| 9,374,353 | B2 * | 6/2016 | Vank ..................... H04L 63/08 |
| 2001/0023486 | A1 | 9/2001 | Kayashima et al. |
| 2002/0066035 | A1 | 5/2002 | Dapp |
| 2002/0154178 | A1 | 10/2002 | Barnett et al. |
| 2002/0162026 | A1 | 10/2002 | Neuman et al. |
| 2003/0101355 | A1 | 5/2003 | Mattsson |
| 2003/0149888 | A1 | 8/2003 | Yadav |
| 2003/0217148 | A1 | 11/2003 | Mullen et al. |
| 2004/0006546 | A1 | 1/2004 | Wedlake et al. |
| 2004/0117624 | A1 | 6/2004 | Brandt et al. |
| 2004/0158735 | A1 | 8/2004 | Roese |
| 2004/0255154 | A1 | 12/2004 | Kwan et al. |
| 2004/0260760 | A1 | 12/2004 | Curnyn |
| 2005/0050336 | A1 | 3/2005 | Liang et al. |
| 2005/0097357 | A1 | 5/2005 | Smith |
| 2005/0152305 | A1 | 7/2005 | Ji et al. |
| 2005/0257267 | A1 | 11/2005 | Williams et al. |
| 2005/0273853 | A1 | 12/2005 | Oba et al. |
| 2006/0028996 | A1 | 2/2006 | Huegen et al. |
| 2006/0130139 | A1 | 6/2006 | Sobel et al. |
| 2006/0161653 | A1 | 7/2006 | Webb et al. |
| 2006/0164199 | A1 | 7/2006 | Gilde et al. |
| 2006/0168648 | A1 | 7/2006 | Vank et al. |
| 2007/0192862 | A1 | 8/2007 | Vermeulen et al. |
| 2008/0060076 | A1 | 3/2008 | Webb et al. |
| 2009/0198804 | A1 | 8/2009 | Danforth et al. |
| 2009/0217346 | A1 | 8/2009 | Manring et al. |
| 2009/0307753 | A1 | 12/2009 | Dupont et al. |
| 2010/0299695 | A1 | 11/2010 | Watson et al. |
| 2010/0333176 | A1 | 12/2010 | Vank et al. |
| 2012/0106546 | A1 | 5/2012 | Sinha |
| 2013/0091534 | A1 | 4/2013 | Gilde et al. |
| 2014/0013384 | A1 | 1/2014 | Webb et al. |
| 2014/0075505 | A1 | 3/2014 | Subramanian |
| 2014/0123213 | A1 | 5/2014 | Vank et al. |

FOREIGN PATENT DOCUMENTS

| | | |
|---|---|---|
| WO | WO 2006/081237 | 8/2006 |
| WO | WO 2006/081302 | 8/2006 |
| WO | WO 2014/043032 | 3/2014 |

OTHER PUBLICATIONS

PPP Extensible Authentication Protocol (EAP), http://tools.ietf.org/html/rfc2284, last modified Mar. 1998, 15 pages.

Aboba et al., "Extensible Authentication Protocol (EAP)," http://tools.ietf.org/html/rfc3748, last modified Jun. 2004, 64 pages.

Vermeulen, Vincent, MAC Address Search and Containment Automation, U.S. Appl. No. 60/570,962, May 2004 (3 pages).

Lars Strand, "802.1X Port-Based Authentication HOWTO", Aug. 18, 2004, Linux Online, Chapter 1, Website: http://www.linux.org/docs/ldp/howto/8021X-HOWTO/introl.htrril, printed Oct. 15, 2009 (8 pages).

Release Notes; Network Security Platform 6.1, Network Security Manager Software 6.1.5.5-N-550, Rev. A, copyright 2012 McAfee, Inc., printed Sep. 5, 2012 from website: https://kc.mcafee.corn/resources/sites/MCAFEE/content/live/PRODUCT_DOCUMENTATION/23000/PD23732/en_US/NSP-6.1.5.5-6.1.5.24-N-550-Release-Notes-Rev.A.PDF, 4 pages.

Release Notes; Network Security Platform 6.1, Network Security Manager Software 6.1.5.5-N-450, Rev. B, copyright 2012 McAfee, Inc., printed Sep. 5, 2012 from website: https://kc.mcafee.corn/resources/sites/MCAFEE/content/live/PRODUCT_DOCUMENTATION/23000/PD23609/en_US/NSP-6.1.5.5-6.1.5.15-N-450-Release-Notes-Rev.B.PDF, 6 pages.

Unified Secure Access Solution for Network Access Control, Solution Brief, copyright 2009 McAfee, Inc., printed Sep. 5, 2012 from website: http://www.mcafee.com/us/resources/solution-briefs/sb-unified-secure-access-solution-for-nac.pdf, 4 pages.

The Network Access Control Challenge, White Paper, copyright 2010 McAfee, Inc., printed Sep. 5, 2012 from website: http://www.mcafee.corn/us/resources/white-papers/wp-network-access-control-challenge.pdf, 11 pages.

Unify Endpoint and Network Security with McAfee Network Access Control (NAC), White Paper, copyright 2009 McAfee, Inc., printed Sep. 5, 2012 from website: http://www.mcafee.com/us/resources/white-papers/wp-unify-endpoint-security-with-nac.pdf, 10 pages.

Jamey Heary, et al., Cisco NAC Appliance—Enforcing Host Security with Clean Access, Cisco Press, copyright 2008 Cisco Systems, Inc., 48 pages.

PCT International Search Report and Written Opinion PCT International Application Serial No. PCT/US2006/02663 dated Apr. 25, 2007 (5 pages).

PCT International Preliminary Report on Patentability in PCT International Application Serial No. PCT/US2006/02663 dated Jul. 31, 2007 (5 pages).

PCT International Search Report and Written Opinion in PCT International Application Serial No. PCT/US2006/02466, dated Sep. 24, 2007 (4 pages).

PCT International Preliminary Report on Patentability in PCT International Application Serial No. PCT/US2006/02466 dated Oct. 16, 2007 (4 pages).

PCT International Search Report and Written Opinion in PCT International Patent Application Serial No. PCT/US2006/01753 dated Sep. 20, 2007 (6 pages).

PCT International Prelimininary Report on Patentability in PCT International Application Serial No. PCT/US2006/01753 dated Oct. 9, 2007 (6 pages).

PCT International Search Report and Written Opinion in PCT International Application No. Serial No. PCT/US2013/058764 , dated Dec. 27, 2013 (10 pages).

PCT International Preliminary Report on Patentability in PCT International Application Serial No. PCT/US2013/058764 dated Mar. 17, 2015 (6 pages).

(56) References Cited

OTHER PUBLICATIONS

U.S. Appl. No. 60/647,646 filed Jan. 26, 2005 entitled Network Appliance for Securely Quarantining a Node on a Network, Inventors Gilde et al. (45 pages).
Non-Final Office Action in U.S. Appl. No. 11/336,692 dated Apr. 1, 2009 (13 pages).
Final Office Action in U.S. Appl. No. 11/336,692 dated Nov. 19, 2009 (14 pages).
Non-Final Office Action in U.S. Appl. No. 11/336,692 dated Mar. 5, 2010 (14 pages).
Final Office Action in U.S. Appl. No. 11/336,692 dated Aug. 19, 2010 (15 pages).
Examiner's Answer in U.S. Appl. No. 11/336,692 dated Apr. 15, 2011 (20 pages).
BPAI Decision on Appeal in U.S. Appl. No. 11/336,692 dated Mar. 24, 2014 (12 pages).
U.S. Appl. No. 11/461,321, filed Jul. 31, 2006.
Non-Final Office Action in U.S. Appl. No. 11/461,321 dated Apr. 1, 2009 (17 pages).
Final Office Action in U.S. Appl. No. 11/461,321 dated Oct. 28, 2009 (22 pages).
Advisory Action in U.S. Appl. No. 11/461,321 dated Jan. 21, 2010 (3 pages).
Non-Final Office Action in U.S. Appl. No. 11/461,321 dated Jun. 10, 2010 (29 pages).
Non-Final Office Action in U.S. Appl. No. 11/461,321 dated Nov. 26, 2010 (38 pages).
Final Office Action in U.S. Appl. No. 11/461,321 dated May 16, 2011 (37 pages).
Advisory Action in U.S. Appl. No. 11/461,321 dated Aug. 23, 2011 (3 pages).
Non-Final Office Action in U.S. Appl. No. 11/461,321 dated Nov. 9, 2011 (11 pages).
Final Office Action in U.S. Appl. No. 11/461,321 dated Apr. 26, 2012 (14 page).
Notice of Allowance in U.S. Appl. No. 11/461,321 dated Oct. 3, 2012 (8 pages).
Notice of Allowance in U.S. Appl. No. 11/461,321 dated Apr. 25, 2013 (9 pages).
Non-Final Office Action in U.S. Appl. No. 11/337,408 dated Dec. 10, 2009 (15 pages) (15 pages).
Notice of Allowance in U.S. Appl. No. 11/337,408 dated May 18, 2010 (6 pages).
Notice of Allowance in U.S. Appl. No. 11/337,408 dated May 26, 2010 (6 pages).
Non-Final Office Action in U.S. Appl. No. 12/879,319 dated Feb. 3, 2012 (21 pages).
Final Office Action in U.S. Appl. No. 12/879,319 dated Jun. 6, 2012 (7 pages).
Notice of Allowance in U.S. Appl. No. 12/879,319 dated Aug. 29, 2012 (5 pages).
Notice of Allowance in U.S. Appl. No. 12/879,319 dated Dec. 4, 2012 (5 pages).
Notice of Allowance in U.S. Appl. No. 12/879,319 dated Apr. 26, 2013 (6 pages).
Non-Final Office Action in U.S. Appl. No. 13/610,048 dated Jun. 6, 2014 (15 pages).
Final Office Action in U.S. Appl. No. 13/610,048 dated Feb. 4, 2015 (15 pages).
Non-Final Office Action in U.S. Appl. No. 11/331,776 dated Mar. 13, 2007.
Notice of Allowance in U.S. Appl. No. 11/331,776 dated Jul. 10, 2007.
Notice of Allowance in U.S. Appl. No. 11/331,776 dated Oct. 28, 2007.
Non-Final Office Action in U.S. Appl. No. 11/877,496 dated Oct. 28, 2008.
Final Office Action in U.S. Appl. No. 11/877,496 dated Jul. 20, 2009.
Non-Final Office Action in U.S. Appl. No. 11/877,496 dated Dec. 18, 2009.
Final Office Action in U.S. Appl. No. 11/877,496 dated May 17, 2010.
Board of Patent Appeals Decision in U.S. Appl. No. 11/877,496 dated Apr. 30, 2013.
Notice of Allowance in U.S. Appl. No. 11/877,496 dated May 28, 2013.
Non-Final Office Action in U.S. Appl. No. 14/015,138 dated Aug. 18, 2014 (11 pages).
Final Office Action in U.S. Appl. No. 14/015,138 dated Dec. 8, 2014 (11 pages).
Advisory Action in U.S. Appl. No. 14/015,138 dated Feb. 9, 2015 (3 pages).
Pre-Brief Appeal Conference Decision in U.S. Appl. No. 14/015,138 dated May 4, 2015 (2 pages).
Non-Final Office Action in U.S. Appl. No. 14/015,138 dated May 8, 2015 (17 pages).
Pre-Brief Conference Decision in U.S. Appl. No. 11/877,496 dated Aug. 10, 2010 (2 pages).
Examiner's Answer to Appeal Brief in U.S. Appl. No. 11/877,496 dated Apr. 11, 2010 (16 pages).
U.S. Patent U.S. Appl. No. 11/461,321, filed Jul. 31, 2006, entitled "Network Appliance for Customizable Quarantining of a Node of a Network," Inventor(s): Robert G. Glide, et al.
Non-Final Office Action in U.S. Appl. No. 13/952,245 dated Sep. 26, 2014 (18 pages).
Final Office action in U.S. Appl. No. 13/952,245 dated Apr. 29, 2015 (20 pages).
Non-Final Office Action in U.S. Appl. No. 13/952,245 dated Oct. 7, 2015 (7 pages).
Notice of Allowance in U.S. Appl. No. 13/952,245 dated Feb. 18, 2016 (5 pages).
Final Office Action in U.S. Appl. No. 14/015,138 dated Sep. 8, 2015 (14 pages).
Notice of Allowance in U.S. Appl. No. 14/015,138 dated Nov. 25, 2015 (6 pages).

\* cited by examiner

ENABLING DYNAMIC AUTHENTICATION WITH DIFFERENT PROTOCOLS ON THE SAME PORT FOR A SWITCH

CROSS-REFERENCE TO RELATED APPLICATIONS

This application is a continuation (and claims the benefit under 35 U.S.C. § 120) of U.S. patent application Ser. No. 13/952,245, filed on Jul. 26, 2013, entitled "Enabling Dynamic Authentication with Different Protocols on the Same Port for a Switch," which is a continuation (and claims the benefit under 35 U.S.C. § 120) of Ser. No. 12/879,319, filed on Sep. 10, 2010, now issued as U.S. Pat. No. 8,522, 318, entitled "Enabling Dynamic Authentication with Different Protocols on the Same Port for a Switch," which application is a continuation (and claims the benefit under 35 U.S.C. § 120) of Ser. No. 11/337,408, filed Jan. 23, 2006, now issued as U.S. Pat. No. 7,810,138, entitled "Enabling Dynamic Authentication with Different Protocols on the Same Port for a Switch," which application claims the benefit under 35 U.S.C. § 119(e) of U.S. Provisional Application Ser. No. 60/647,692 filed on Jan. 26, 2005, entitled "Enabling Dynamic Authentication With Different Protocols On The Same Port For A Switch," and also claims the benefit of under 35 U.S.C. § 119(e) of U.S. Provisional Application Ser. No. 60/750,643 filed on Dec. 14, 2005, entitled "Enabling Dynamic Authentication With Different Protocols On The Same Port For A Switch," The disclosures of the prior applications are considered a part of and are incorporated by reference in their entireties in the disclosure of the present application.

FIELD OF THE INVENTION

The present invention relates to network security, and in particular, but not exclusively, to enabling enforcement of access control on a network.

BACKGROUND OF THE INVENTION

Businesses are deriving tremendous financial benefits from using the internet to strengthen relationships and improve connectivity with customers, suppliers, partners, and employees. Progressive organizations are integrating critical information systems including customer service, financial, distribution, and procurement from their private networks with the Internet. The business benefits are significant, but not without risk. Unfortunately, the risks are growing.

In response to the growing business risks of attacks, potentials for legal suits, federal compliance requirements, and so forth, companies have spent millions to protect the digital assets supporting their critical information systems. In particular, many companies have recognized that the first security barrier to their business's information systems is their access control system.

Access control pertains to an infrastructure that is directed towards enforcing access rights for network resources. Access control may grant or deny permission to a given device user, device or node, for accessing a resource and may protect resources by limiting access to only authenticated and authorized users and/or devices.

Most of today's switches have an IEEE 802.1X port authenticator built in to the switch. This allows for 802.1X authentication on any of its ports, but it also has the requirement that every client has to support the 802.1X protocol. However, for clients that do not support the 802.1X protocol, they cannot gain access to any of the resources provided by the switch. Therefore, it is with respect this and other considerations, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE INVENTION

Figure 1:
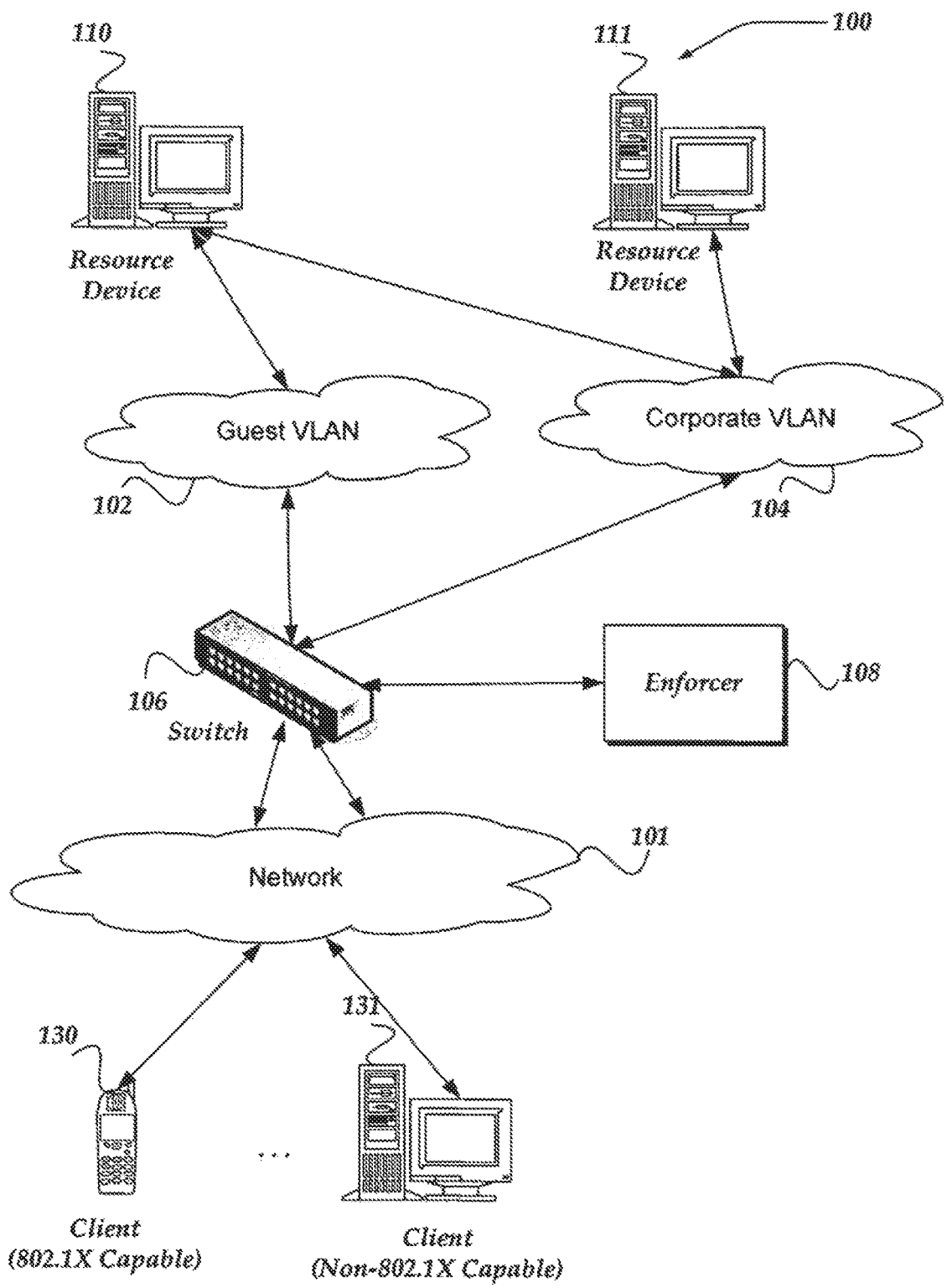
FIG. 1 illustrates one embodiment of system for enabling dynamic authentication with different protocols on the same port for a switch.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term node, including virtually any computing device that is capable of connecting to a network. Such devices include, but are not limited to, personal computers, mobile devices, multiprocessor systems, microprocessor-based or programmable consumer electronics, network PCs, servers, network appliances, and the like.

The IEEE 802.1X authentication standard uses an existing protocol, Extensible Authentication Protocol (EAP), for message exchange during an authentication process. Thus, 802.1X may employ a variety of EAP authentication mechanisms, including, but not limited to MD5, Transport Layer Security (TLS), Tunneled Transport Layer Security (TTLS), Lightweight EAP (LEAP), PEAP, or the like. 802.1X is configured to work over Ethernet, Token rings, and other wired, as well as wireless networks. Typically, in a wireless network with 802.1X, a client device requests access to a resource through an 802.1X enabled switch, access point, or the like, sometimes called an authenticator. The client device may then provide an EAP message to the switch. In one embodiment, the message may be an EAP start message. In turn, the switch may provide an EAP message to the client device requesting its identity. When the client provides its identity, the switch may repackage the identity and forward it to an authentication server. The authentication server may then authenticate the client device, and return an accept or reject message to the switch. In one embodiment, the authentication server may employ a Remote Authentication Dial-In User Service (RADIUS), however, the invention is not so limited, and virtually any authentication service may be employed, including an X.509 Certification Authority server, or the like. As used throughout this application, including the claims, 802.1X refers to the IEEE 802.1X protocol and all authentication protocols derived therefrom.

Briefly stated, the present invention is directed towards an apparatus, system, and method for enabling a client that does not support IEEE 802.1X authentication to still gain access to at least some resources provided through a switch that supports 802.1X authentication. The invention enables such access to at least some resources by using dynamic authentication with different protocols on the same port for the switch. In one embodiment, the switch port may begin in a mode that enables 802.1X authentication. When a client attempts to join a network to access the resources, the switch may monitor for an 802.1X authentication message from the client. In one embodiment, the message may be an 802.1X start message, or the like. In one embodiment, the switch may select to send an 802.1X authentication message to the client in the form of a request for the client's identity. In another embodiment, other predefined failure conditions may also be monitored for, including an incorrect authentication credential associated with the client, an improperly configured supplicant (e.g., client accessing the port), inoperable switch, or the like.

In any event, if the client fails to send an 802.1X authentication message, to respond to the 802.1X request for the client's identity, or a predefined failure condition is detected the client may be deemed incapable of supporting 802.1X authentication. In one embodiment, the client may be initially placed on a Virtual Local Area Network (VLAN) that is arranged to quarantine the client when the client requests access to the network. In another embodiment, the client may be placed on the quarantine VLAN after a determination that the client fails to perform an 802.1X authentication within a backoff time limit. In one embodiment, network traffic to and/or from the client is redirected through the switch towards a network device arranged to manage and/or filter the client's network traffic. Although the client may be deemed incapable of supporting 802.1X authentication, the client may still gain access to at least some resources provided through the switch based on use of a non-802.1X authentication mechanism. Such non-802.1X authentication mechanisms include, but are not limited to name/passwords, digital certificates, or the like. In one embodiment, the network device, or another device, may present the quarantined client with an interface, or the like, that enables the client to employ a non-802.1X authentication mechanism. In one embodiment, the interface may include a web page, Command Line Interface (CLI), or the like.

Illustrative Operating Environment

FIG. 1 illustrates one embodiment of system for enabling dynamic authentication with different protocols on the same port for a switch. As shown in the figure, system 100 includes switch 106, enforcer 108, resource devices 110-111, client devices 130-131 network 101, and Virtual Local Area Networks (VLANs) that are segmented into at least guest VLAN 102 and corporate VLAN 104.

Client devices 130-131 are in communication through network 101 to a switch port on switch 106. Switch 106 is in communication with guest VLAN 102 and corporate VLAN 104. Enforcer 108 is in communication with switch 106. Resource device 110 is in communication with guest VLAN 102 and corporate VLAN 104. Resource device 111 is in communication with corporate VLAN 104.

One embodiment of client devices 130-131 is described in more detail below in conjunction with FIG. 3. Generally, however, client devices 130-131 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 130-131 may also include other computing devices, such as personal computers, multiprocessor systems, microprocessor-based or programmable consumer electronics, network devices, and the like. As such, client devices 130-131 may range widely in terms of capabilities and features. For example, a client device configured as a cell phone may have a numeric keypad and a few lines of monochrome LCD display on which only text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Moreover, some client devices may be configured to support 802.1X authentication mechanisms, while other client device may be not be so configured. As shown in the figure, client device 130 represents one embodiment of a client device that is capable of 802.1X authentication, while client device 131 represents one embodiment of a client device that is incapable of 802.1X authentication. However, client device 131 may be configured to employ a variety of other authentication mechanisms, including, but not limited to user name/passwords, digital certificates, tokens, browser based authentication, windows based authentication, Kerberos, one-time passwords, public key authentication, biometrics, or the like.

Client devices 130-131 also may include at least one client application that is configured to receive content from another computing device. The client application may include a capability to provide and receive textual content, graphical content, audio content, alerts, messages, and the like. Moreover, client devices 130-131 may be further configured to communicate a message, such as through a Short Message Service (SMS), Multimedia Message Service (MMS), instant messaging (IM), internet relay chat (IRC), mIRC, Jabber, and the like, between another computing device, and the like.

In one embodiment, client devices 130-131 may be configured such that an end-user may operate the computing device to make requests for data and/or services from other computers on the network. In one embodiment, client devices 130-131 may employ a network interface unit (sometimes called a transceiver), such as described below, to communicate information with another computing device. In one embodiment, the requested data resides in computing devices such as resource devices 110-111. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, client devices 130-131 are a computing device that is not operated by an end-user.

Network 101, guest VLAN 102, and corporate VLAN 104 are configured to couple one computing device with another computing device. Guest VLAN 102 and corporate VLAN 104 represent particular types of networking structures; however, all three may be described generically to employ any form of computer readable media for communicating data from one electronic device to another. Generally, such networks can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Also, communication links within LANs can include, for example, twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices can be remotely connected to either LANs or WANs via a modem and temporary telephone link.

Such networks may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as a mobile device with various degrees of mobility. For example, such networks may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, such networks may include virtually any wireless and/or wired communication mechanism by which data may travel between one computing device and another computing device.

The media used to transmit data in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any data delivery media. The terms "modulated data signal," and "carrier-wave signal" includes a signal that has one or more of its characteristics set or changed in such a manner as to encode data, instructions, data, and the like, in the signal. By way of example, communication media includes wired media such as twisted pair, coaxial cable, fiber optics, wave guides, and other wired media and wireless media such as acoustic, RF, infrared, and other wireless media.

Shown are two VLANs (guest VLAN 102 and corporate VLAN 104). However, the invention is not so limited and can be employed with a plurality of segmented VLANs. As shown, guest VLAN 102 may represent a particular network configuration that may be managed through a network device. In one embodiment, the network device is arranged to effectively filter network traffic from and/or to devices on guest VLAN 102 and to restrict access to particular resources by such clients. Corporate VLAN 104 may represent a particular network configuration such as an intranet for a corporation, or the like. The two networks may differ in a level of computing access security enforcement. For example, devices placed onto guest VLAN 102 may be more restricted in what resources may be accessed, what network traffic may flow beyond guest VLAN 102, or the like, than a device placed on corporate VLAN 104. In one embodiment, for example, virtually all network traffic from and/or to a device on guest VLAN 102 may filtered through the network device to effectively quarantine a device from virtually every other device One embodiment of enforcer 108 is described in more detail below in conjunction with FIG. 2. Briefly, however, enforcer 108 includes virtually any network device that is configured to manage and enforce a networking security policy. Enforcer 108 is configured to listen for authentication requests on the ports of switch 106. Enforcer 108 and switch 106 may authenticate client devices 130-131 through a variety of mechanisms including an 802.1X authentication, or non-802.1X authentication protocols. In one embodiment, in a non-802.1X authentication mode, enforcer 108 may not act as an authentication server or an authentication proxy for the 802.1X authentication. However, in another embodiment, in non-802.1X authentication mode, enforcer 108 may provide an interface such as a web page, CLI screen, or the like, for use in authentication. In one embodiment, enforcer 108 may employ inputs provided by the client device to perform authentication, or forward the inputs to another device (not shown) for authentication.

Enforcer 108 may conduct an audit of various network devices on-schedule or on-demand to ensure conformance with various security policies. Enforcer 108 may be configured to ensure the right users are on the network segments, and that devices comply with the security policy to minimize exposure to unauthorized access, exploits, and/or attacks.

Enforcer 108 may be configured to manage access in part by remotely managing switch 106 using various mechanisms, including SNMP, SSH, Telnet, or the like. Enforcer 108 may enable the configuration of switch 106 to be changed on the fly. Enforcer 108 can also receive Layer 2 (OSI Reference Model) broadcasts from clients through switch 106. In one embodiment, this attribute can be useful if EAP over LAN (EAPOL) frames from the clients are sent to the 01:80:C2:00:00:03 broadcast group. Additionally, in one embodiment, enforcer 108 can operate as an authentication server or a proxy authenticator for the client that is authenticating via 802.1X. For example, enforcer 108 may process EAP-success and EAP-reject packets. In one embodiment, enforcer 108 may also provide authentication information to another device (not shown), for authentication.

In one embodiment, enforcer 108 is a network appliance. It is important to note, however, that while enforcer 108 can be configured as a network appliance, the invention is not so limited, and the invention may employ virtually any implementation, including a server, or the like. Thus, enforcer 108 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, or the like. Moreover, enforcer 108 may communicate with other devices using a variety of networking communication protocols, including wireless and/or wired protocols and related mechanisms. In one embodiment, enforcer 108 may employ a secure channel over which communications may travel.

In networks, a switch may filter and forward packets between LAN segments. Switches typically operate at a data link layer (layer 2) and sometimes a network layer (layer 3) of the OSI Reference Model and therefore typically support any packet protocol. LANs that use switches to join segments are called switched LANs. Typically, packet protocols such as TCP/IP and UDP/IP are employed at layer 3 of the OSI Reference Model for processing packets. Switches can also support secure protocols such as Secure Sockets Layer (SSL), Transport Layer Security (TLS), or the like. Switch 106 is one embodiment of a switch.

Switch 106 may receive network packets from one computing device on one network segment and route the network packets over another network segment to another computing device. Switch 106 may employ a variety of network ports to manage various network packets.

Switch 106 may enable client devices 130-131 access to guest VLAN 102 and/or corporate VLAN 104 based in part on directions from enforcer 108. Guest VLAN 102 may provide access to resource device 110. Corporate VLAN 104 may provide access to resource devices 110-111. In general corporate VLAN 104 may grant access to more or different resources than accessible by guest VLAN 102.

In one embodiment, switch 106 is capable of supporting IEEE 802.1X authentication. For example, switch 106 may be enabled to be an access point capable of processing EAP-start packets, EAP-request identity packets, EAP-response packets, EAP-success packets, EAP-reject packets, or the like. Also, switch 106 may be configured to support VLANs including, but not limited to port based VLANs, subnet based VLANs, protocol based VLANs, and Media Access Control (MAC) Layer based VLANs. Additionally, a port on switch 106 can be placed in at least one of two modes, including auto and authorized.

In the auto mode, IEEE 802.1X authentication is enabled on a port of switch 106. Also, in one embodiment, the port may start in the unauthorized mode where no packets are passed through the port until an 802.1X authentication has been completed.

In the authorized mode, IEEE 802.1X authentication may be disabled on a port of switch 106. Also, the port may start in the authorized mode. For the authorized mode, any packets including 802.1X packets may be treated as regular network packets and are forwarded through switch 106.

Moreover, enforcer 108 may have access to guest VLAN 102 with no router disposed between it, and switch 106. In this way, enforcer 108 can see 802.1X packets coming from a client when a switch port on switch 106 is in the authorized mode.

Although, switch 106 is illustrated (and referred to) as a switch, the invention is not so limited, and other devices may be employed instead of a switch, including, but not limited to a router, bridge, gateway, network appliance, access point, server, or the like.

Resource devices 110-111 may include any computing device capable of communicating packets to provide a response to a request for data and/or services. Each packet may convey a piece of information. A packet may be sent for handshaking, e.g., to establish a connection or to acknowledge receipt of data. The packet may include information such as a request, a response, or the like. Generally, packets received by resource devices 110-111 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between resource devices 110-111 employing HTTP, HTTPS, or the like.

In one embodiment, resource devices 110-111 are configured to operate as a website server. However, resource devices 110-111 are not limited to web servers, and may also operate a messaging server, a File Transfer Protocol (FTP) server, a database server, content server, LDAP servers, printing services, or the like.

Additionally, each of resource devices 110-111 may be configured to perform a different operation. Thus, for example, resource device 110 may be configured as a messaging server, while server 110 is configured as a database server. In one embodiment, resource device 110 may provide a more restricted set of resources, a reduced subset of resources, or the like, from resource device 111. Resource device 110 may be a more limited resource, such as a web page enabled to provide a non-802.1X authentication mechanism, information about why 802.1X authentication for a client has been denied, remediation information, and the like. Moreover, while resource devices 110-111 may operate as other than a website, they may still be enabled to receive an HTTP communication.

Illustrative Network Appliance as an Enforcer

Figure 2:
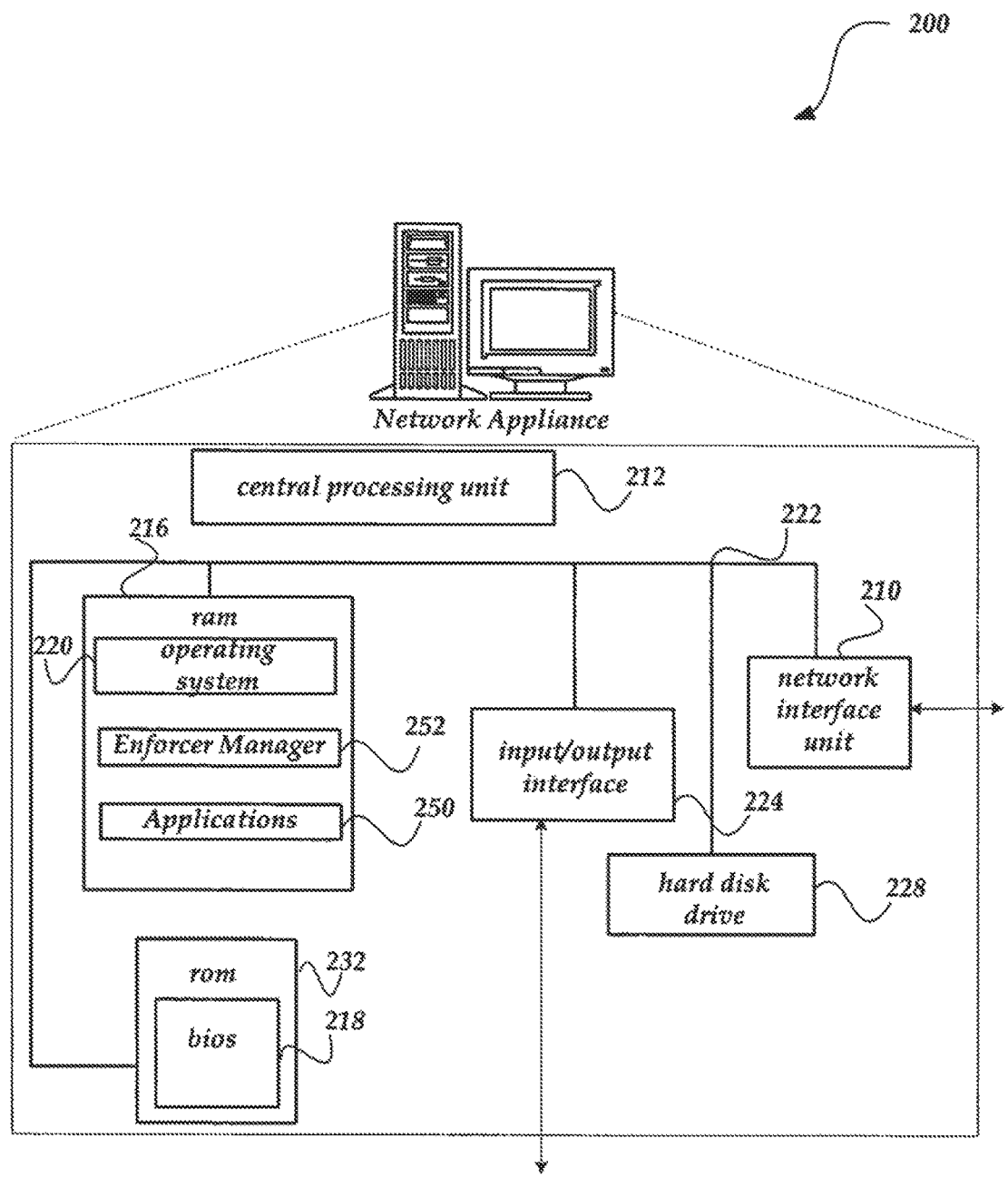
FIG. 2 illustrates one embodiment of a network appliance that may be included in a system implementing the invention.

FIG. 2 illustrates one embodiment of a network appliance that may be included in a system implementing the invention, in accordance with the present invention. The network appliance may include many more components than those shown. The components shown, however, are sufficient to disclose an illustrative embodiment for practicing the invention. In addition, although the invention illustrates use of a network appliance, the invention is not so constrained, and virtually any network computing device may be employed, including a server, and the like. Network appliance 200 may be employed, in one embodiment, as enforcer 108 of FIG. 1.

Network appliance 200 includes processing unit 212, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network appliance 200. Any general-purpose operating system may be employed. Basic input/output system ("BIOS") 218 is also provided for controlling the low-level operation of network appliance 200. As illustrated in FIG. 2, network appliance 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), and the like.

Network appliance 200 may also include an SMTP handler application for transmitting and receiving email. Network appliance 200 may also include an HTTP handler application for receiving and handing HTTP requests, and an HTTPS handler application for handling secure connections. The HTTPS handler application may initiate communication with an external application in a secure fashion.

Network appliance 200 also includes input/output interface 224 for communicating with external devices, such as a mouse, keyboard, scanner, or other input devices not shown in FIG. 2. Likewise, network appliance 200 may further include additional mass storage facilities such as hard disk drive 228. Hard disk drive 228 is utilized by network appliance 200 to store, among other things, application programs, databases, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Applications 250 may further include an SNMP client, an SNMP trap sink, an 802.1X authentication server application, a Virtual Local Area Network (VLAN) Assignment Protocol (VLAP) peer application, a proxy web server, and a directory service. However, the invention is not limited to these applications, and others may be implemented, without departing from the scope of spirit of the invention. Additionally, Enforcer Manager 252 enables at least a portion of the actions discussed below in conjunction with FIGS. 4.

Illustrative Client Device

Figure 3:
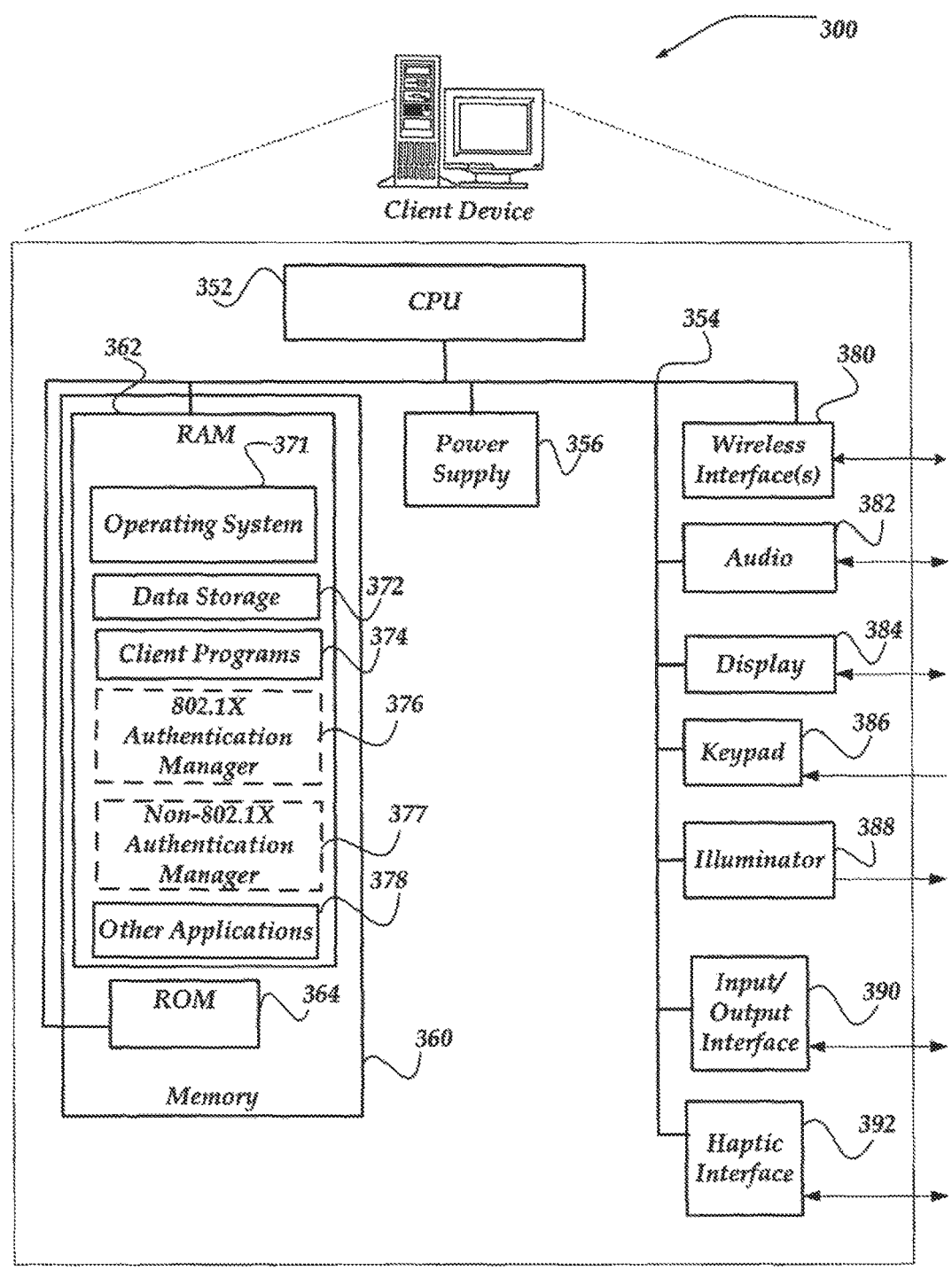
FIG. 3 shows one embodiment of a client device in accordance with the present invention.

FIG. 3 shows one embodiment of a client device that may operate as a client device, such as client devices 130-131 of FIG. 1. In one embodiment, client device 300 is a mobile phone that is arranged to send and receive voice communications, text-based messages, multimedia data, and other data by way of one or more wireless communication interfaces. Generally, client device 300 may include any electronic device capable of such wireless communication, including, but not limited to, any personal electronic device. Client devices are typically capable of communication by connecting to one or more wireless networks, connecting to multiple nodes of a single wireless network, communicating over one or more channels to one or more networks, or otherwise engaging in one or more communication sessions. Such devices include mobile phones, cellular phones, smart phones, pagers, RF devices, IR devices, integrated devices combining one or more of the preceding devices, and the like. Client device 300 may also include other electronic devices such as personal digital assistants, handheld computers, personal computers, microprocessor-based or programmable consumer electronic devices, wearable computers, and the like.

Client device 300 may include many more components than those shown in FIG. 3, and need not include all of the components shown therein. However, the components shown are sufficient to disclose an illustrative embodiment for practicing the present invention. As shown in the figure, client device 300 includes CPU 352 in communication with memory 360 by way of bus 354.

Client device 300 also includes power supply 356, one or more wireless interfaces 380, audio interface 382, display 384, keypad 386, illuminator 388, input/output interface 390, and haptic interface 392. Power supply 356 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another wireless mobile or non-mobile device. Input/output interface 390 includes circuitry for coupling client device 300 to one or more wireless networks, and is constructed for use with one or more communication protocols and technologies including, but not limited to, GSM, CDMA, TDMA, EDGE, UMTS, WCDMA, CDMA 2000, UDP, TCP/IP, SMS, GPRS, WAP, UWB, WiMax, IEEE 802.11x, and the like. Audio interface 382 is arranged to produce and receive audio signals, such as the sound of a human voice. For example, audio interface 382 may be coupled to a speaker and microphone (not shown) to enable telecommunication with others and/or to generate an audio acknowledgement for some action. Display 384 may be a liquid crystal display, gas plasma, light emitting diode, or any other type of display used with a client device or other wireless device. Display 384 may also include a touch sensitive screen arranged to receive input from an object such as a stylus or a human digit.

Keypad 386 may include any input device arranged to receive input from a user. For example, keypad 386 may include a push button numeric dial or an alphanumeric keyboard. Keypad 386 may also include command buttons that are associated with selecting and sending images. Illuminator 388 may provide a status indication and/or provide light. Illuminator 388 may remain active for specific periods of time or in response to events. For example, if illuminator 388 is active, it may backlight the buttons on keypad 386 and remain active while client device 300 is powered. Also, illuminator 388 may backlight these buttons in various patterns if particular actions are performed, such as dialing another client device. Illuminator 388 may also cause light sources positioned within a transparent or translucent case of client device 300 to illuminate in response to actions.

Client device 300 also includes input/output interface 390 for communicating with external devices. Input/output interface 390 may employ one or more appropriate communication technologies, such as USB, IR, Bluetooth, and the like. Haptic interface 392 is arranged to provide tactile feedback to a user of client device 300. For example, haptic interface 392 may be employed to vibrate client device 300 in a particular way when a user of another device, such as a mobile phone, is calling client device 300.

Memory 360 may include RAM 362, ROM 364, and other storage means. Memory 360 also provides data storage 372 and storage of programs, including, for example, operating system 371, client program 374, 802.1X authentication manager 376, and non-802.1X authentication manager 377, and other applications 378. Such programs may include processor-executable instructions which, when executed on client device 300, cause transmission, reception, and other processing of audio data, video data, text messaging data, web pages, Wireless Markup Language (WML) pages, and the like, and enable wireless communication with another device.

In one embodiment, the client device may include 802.1X authentication manager 376, and/or non-802.1X authentication manager 377. 802.1X authentication manager 376 may authenticate a client device through the 802.1X protocol. Non-802.1X authentication manager 377 may authenticate the client device through another authentication mechanism, as described above.

Generalized Operations

Figure 4:
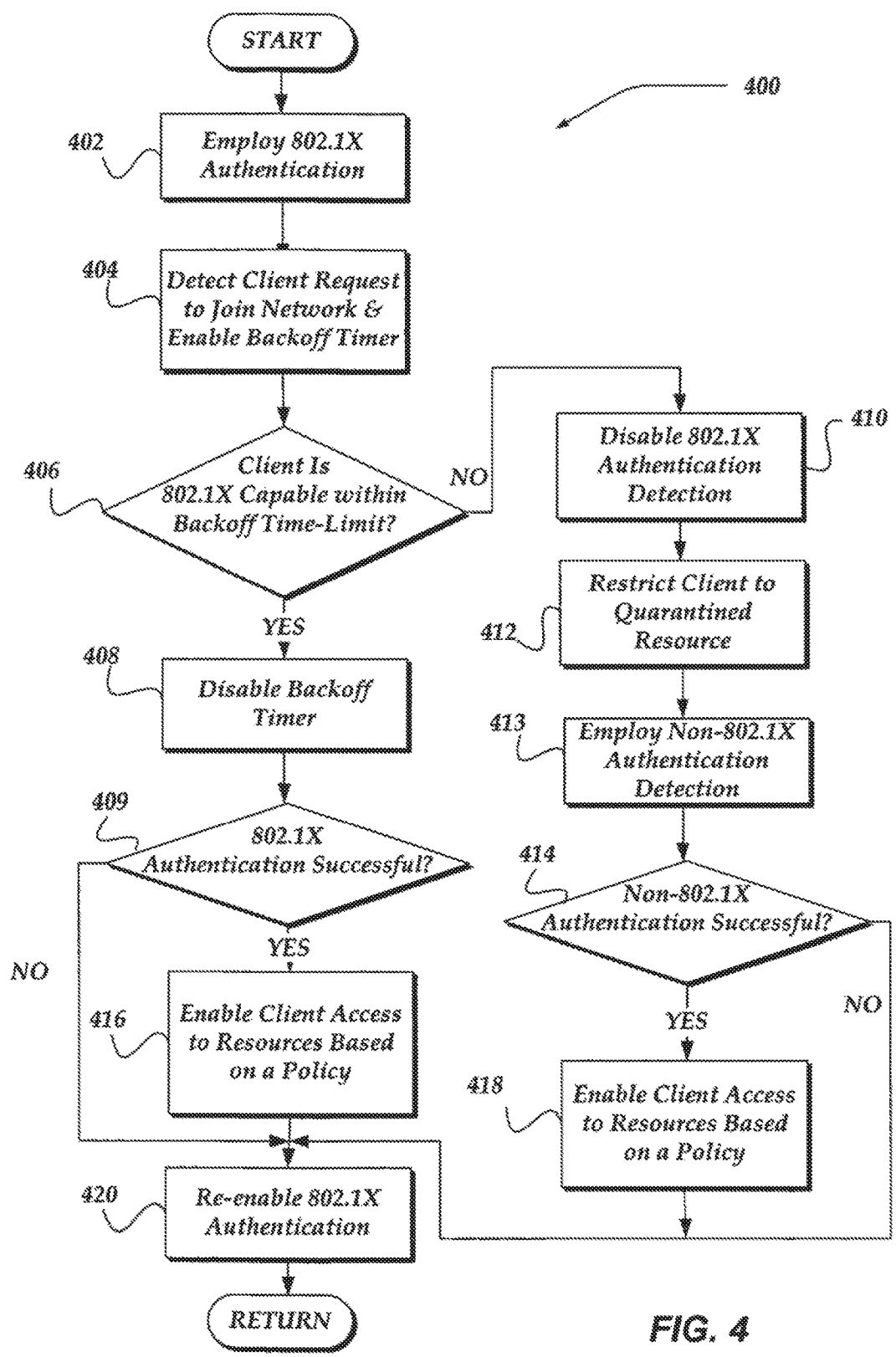
FIG. 4 illustrates a logical flow diagram generally showing one embodiment of a process for enabling dynamic authentication with different protocols using a backoff timer.

The operation of certain aspects of the invention will now be described with respect to FIGS. 4-5. FIG. 4 illustrates a logical flow diagram generally showing one embodiment of a process for enabling dynamic authentication with different protocols using a backoff timer. FIG. 4 may be enabled by enforcer 108 and switch 106 of FIG. 1.

As shown in the figure, process 400 begins, after a start block, at block 402, where a switch and an authentication server are enabled to employ 802.1X authentication. In one embodiment, the enforcer may act as the authentication server. In one embodiment, the enforcer puts a switch port on the switch into an auto mode, thus enabling 802.1X authentication detection. In one embodiment, 802.1X packets may be processed on the switch port, while other packets may be dropped, or otherwise ignored by the switch.

Processing then continues to block 404, where the switch and/or the enforcer detect a client's request to join a network. In one embodiment, the client connects to the port, and the switch emits a Link Up request. In one embodiment, the Link Up request may be emitted because the client that is connected to the switch port has booted up its physical interface. In any event, the enforcer may detect the Link Up request and enable a backoff timer. The backoff timer may be employed as a mechanism to limit an amount of time to monitor for 802.1X authentication messages. Associated with the backoff timer is a time limit. The time limit may be set to a value based on a variety of criteria, including, but not limited to network characteristics, switch characteristics, engineering judgment, or the like. In one embodiment, the time limit may be set between about 1-5 minutes. Moreover, the invention may also use another mechanism to determine when to initiate the backoff timer, including but not limited to an event, signal, or message from the client.

Processing next continues to decision block 406, where a determination is made whether the client is 802.1X capable within the backoff time-limit. In one embodiment, the client may automatically send an 802.1X authentication request, such as an EAP-response message, to the switch, thereby indicating that it is 802.1X capable. In another embodiment, the switch may send an 802.1X initiation request, such as an EAP-request identity message, to the client. If the client is 802.1X capable, it may respond with an 802.1X authentication request. In one embodiment, upon receipt of an 802.1X authentication request message from the client, the determination is made that the client is 802.1X capable. For example, the enforcer acting as an authentication server may determine that the client is 8021.X capable upon receipt of the 802.1X authentication request forwarded from the switch. In another embodiment, the enforcer, acting as an authentication proxy may make this determination upon detecting an 802.1X traffic request being forwarded between the switch and the authentication server. However, the invention is not limited to a client's failure to respond and/or provide an 802.1X authentication message. For example, a variety of other predefined failure conditions may also be employed to determine if the client is 802.1X authentication capable, including, but not limited to the client providing an incorrect authentication credential; a failed, out of date, or otherwise improperly configured supplicant (e.g., the client seeking access to the LAN port providing the request); an inoperable switch; or the like.

In any event, if it is determined that the client is 802.1X authentication capable within the backoff time-limit, processing then flows to block 408. However, if the backoff time limit is exceeded before the enforcer detects an 802.1X authentication request, or the like as described above, a determination is made that the client is not 802.1X capable and processing branches to block 410.

At block 408 the enforcer disables the backoff timer. Processing then continues to decision block 409, where the determination is made whether the client is successfully authenticated with the 802.1X protocol. If the client is successfully authenticated using an 802.1X authentication protocol, the processing continues to block 416 where the client is enabled to access another resource, such as resource devices 110-111, based on a first policy. The enforcer may enable the access. In one embodiment, the switch port associated with the client device may be switched to a corporate VLAN to enable access to additional resources. In one embodiment (not shown), a backend Remote Authentication Dial-In User Service (RADIUS) server could put the client back to a different VLAN on the switch, depending on a policy of the RADIUS server. Processing then continues to block 420, where the enforcer may re-enable 802.1X authentication on the switch port. In one embodiment, this action may be performed if the enforcer detects that the client has requested to disconnect from the network. In one embodiment, when the client disconnects from the switch, a Link Down request (trap or event) may be emitted to the enforcer. The enforcer may clear out a client table, file, database, or the like, for the client that previously existed on that switch port. In one embodiment, if the switch port associated with the client is in a backoff mode, the enforcer may reset the mode of the switch port into an auto mode, thereby re-enabling 802.1X authentication on the switch port. Processing then returns to a calling process.

If, at decision block 409, the client is not successfully authenticated using the 802.1X authentication protocol, then processing may return to the calling process. In another embodiment (not shown), processing may loop back to decision block 409, where the client may be enabled to perform another authentication attempt using an 802.1X authentication protocol. In yet another embodiment, the client may be determined to be 802.1X incapable, and processing may branch to block 410.

At block 410 the enforcer may disable 802.1X processing on the switch port. In one embodiment, the enforcer may set the switch port into a backoff mode. For example, non-802.1X packets, such as HTTP and DHCP, may be enabled to flow through the switch port. In one embodiment, the backoff mode may be the authorized mode. Processing then continues to block 412, where the client is enabled to access quarantined resources, such as resource device 110 of FIG. 1, or the like. In another embodiment, the client may be unable to access resources until it has been authenticated. In still another embodiment, the client's network traffic is routed through the enforcer. In one embodiment, the enforcer enables the switch port to access a quarantined or guest VLAN, such as guest VLAN 102. For example, the enforcer may put the switch port on the guest VLAN through Simple Network Management Protocol (SNMP), SSH Telnet, a proprietary Application Programming Interface (API), or the like.

Processing then continues to block 413, where the enforcer may be enabled to employ a non-802.1X authentication detection mechanism. Processing then continues to decision block 414, where a determination is made whether the client is successfully authenticated using the non-802.1X authentication mechanism. If the client is authenticated successfully, processing continues to block 418 where the enforcer may enable the client device to access more resources or different resources based on a second policy. In one embodiment, the switch port associated with the client device may be switched to a corporate VLAN to enable the access to the other resources, or enable access to another set of resources within the guest VLAN, or the like. Processing then continues to block 420, where the enforcer may re-enable 802.1X authentication on the switch port if the enforcer detects that the client has requested to disconnect from the network. Processing then continues to a calling process.

If, at decision block 414, the client is not successfully authenticated with the non-802.1X authentication mechanism, then processing may continue to block 420, where the enforcer may re-enable 802.1X authentication on the switch port. In one embodiment, this action may be performed if it is detected that the client has requested to disconnect from the network. The process then returns to the calling process. In another embodiment (not shown), processing may loop back to decision block 414, where the client is allowed to make another attempt to connect using a non-802.1X authentication mechanism.

Figure 5:
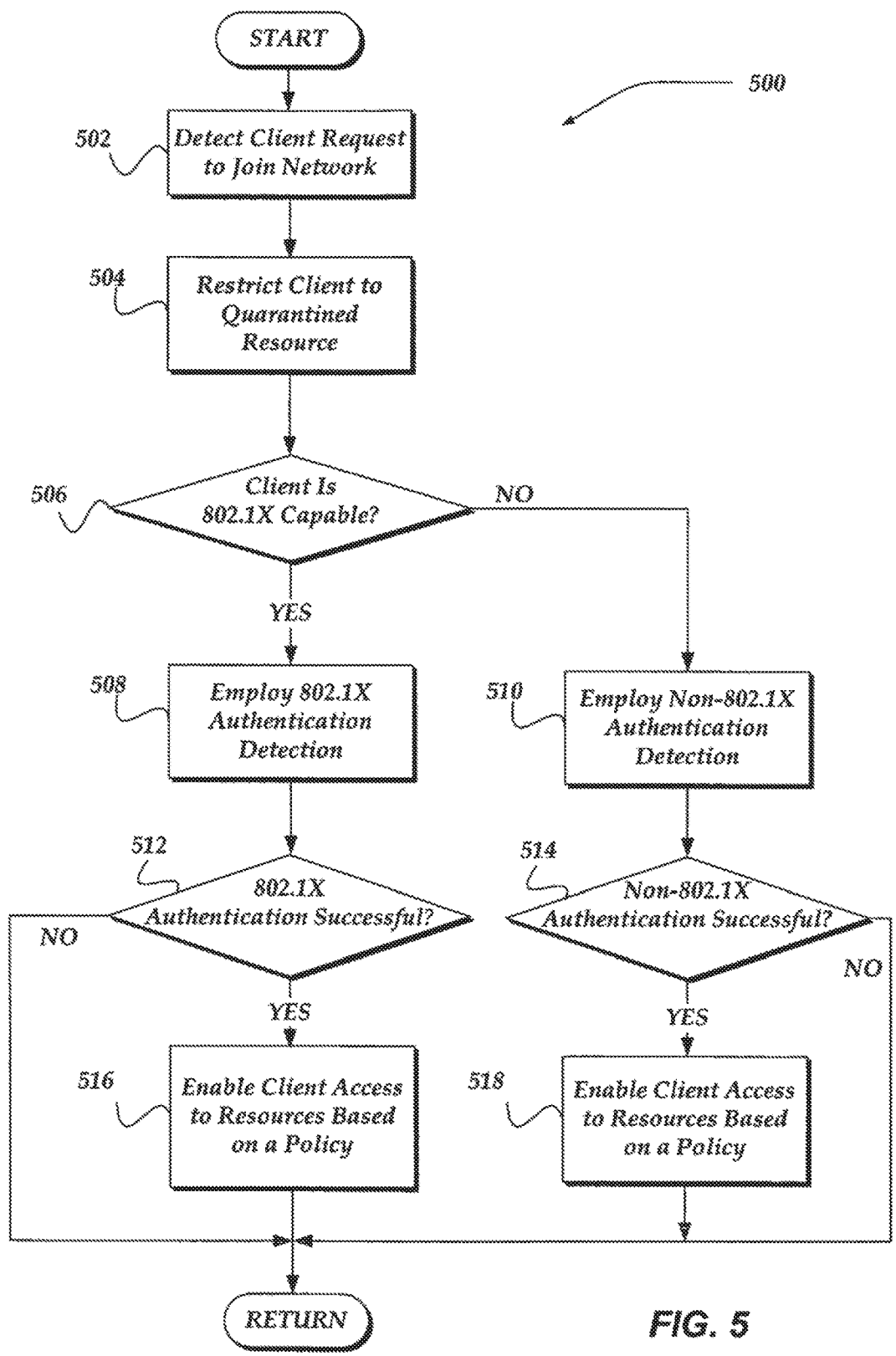
FIG. 5 illustrates a logical flow diagram generally showing one embodiment of a process for enabling dynamic authentication with different protocols on the same port for a switch independent of a backoff timer, in accordance with the present invention.

FIG. 5 illustrates a logical flow diagram generally showing one embodiment of a process for enabling dynamic authentication with different protocols on the same port for a switch independent of a backoff timer. FIG. 5 may be enabled by enforcer 108 and switch 106 of FIG. 1. As shown in the figure, process 500 begins, after a start block, at block 502, where a switch and/or an enforcer detect a client's request to join a network. In one embodiment, the client connects to the port and the switch emits a Link Up request. In one embodiment, the Link Up request may be emitted because the client that is connected to the switch port has booted up its physical interface. In one embodiment, the switch port may be in any mode. In another embodiment, the switch port may be in the authorized mode. In this mode, non-802.1X packets, such as HTTP and DHCP, may be enabled to flow through the switch port.

Processing next continues to block 504 where the client is enabled to access quarantined resources, such as resource device 110 of FIG. 1. In another embodiment, the client may be unable to access resources until it is authenticated. In still another embodiment, the client's network traffic is routed through the enforcer. In one embodiment, the enforcer enables the switch port to access a quarantined or guest VLAN, such as guest VLAN 102. For example, the enforcer may put the switch port on the guest VLAN through Simple Network Management Protocol (SNMP), SSH Telnet, a proprietary Application Programming Interface (API), or the like Processing then continues to decision block 506, where a determination is made whether the client is 802.1X capable. In one embodiment, the client may automatically send an 802.1X authentication request, such as an EAP-response message, to the switch, thereby indicating that it is 802.1X capable. In another embodiment, the switch may send an 802.1X initiation request, such as an EAP-request identity message, or the like, to the client. If the client is 802.1X capable, it may respond with an 802.1X authentication request. In one embodiment, upon receipt of an 802.1X authentication request message from the client, the determination is made that the client is 802.1X capable. For example, the enforcer may act as an authentication server to determine that the client is 8021.X capable upon receipt of the 802.1X authentication request. In another embodiment, the enforcer, acting as an authentication proxy may make this determination upon detecting an 802.1X traffic request being forwarded between the switch and an authentication server. This approach of listening for 802.1X messages from the client device enables slower client devices, and/or client devices on slower network interfaces, or the like, to respond independent of a backoff time constraint.

In one embodiment, the enforcer, or another network device, may provide a web page, or other interface, to the client device. In one embodiment, the interface may enable a user of the client device to initiate a non-802.1X authentication mechanism. Initiation of the non-802.1X authentication mechanism may then indicate that the client device in incapable of 802.1X authentication.

However, the invention is not limited to a client device's failure to respond and/or provide an 802.1X authentication message, or to further initiate a non-802.1X authentication mechanism. For example, a variety of other predefined failure conditions may also be employed to determine if the client device is 802.1X authentication capable, including, but not limited to the client device providing an incorrect authentication credential, a failed or out of date supplicant, an inoperable switch, or the like.

In any event, if, at decision block 506, the determination is made that the client device is 802.1X capable, processing then continues to block 508 where the switch and the authentication server are enabled to employ 802.1X authentication. In one embodiment, the enforcer may act as the authentication server. In one embodiment, the enforcer puts a switch port on the switch into an auto mode, thus enabling 802.1X authentication detection. In one embodiment, 802.1X packets may be processed on the switch port, while other packets may be dropped, or otherwise ignored by the switch. Processing then continues to decision block 512. If, at decision block 506, the determination is made that the client is not 802.1X capable, processing then continues to block 510.

At decision block 512, the determination is made whether the client is successfully authenticated with the 802.1X protocol. If the client is successfully authenticated using an 802.1X authentication protocol, the processing continues to block 516 where the client is enabled to access another resource, such as resource devices 110-111, based on a first policy. The enforcer may enable the access. In one embodiment, the switch port associated with the client device may be switched to a corporate VLAN to enable access to additional resources. In one embodiment (not shown), a backend Remote Authentication Dial-In User Service (RADIUS) server could put the client back to a different VLAN on the switch, depending on the policy of the RADIUS server. Processing may then continue to a calling process.

If, at decision block 512, the client is not successfully authenticated using the 802.1X authentication protocol, then processing may return to the calling process. In another embodiment (not shown), processing may loop back to decision block 512, where the client may be enabled to perform another authentication attempt using an 802.1X authentication protocol. In yet another embodiment, the client may be determined to be 802.1X incapable, and processing may continue to block 510.

At block 510, the enforcer may be enabled to employ a non-802.1X authentication detection mechanism. In one embodiment, this may be through an interface, such as a Command Line Interface (CLI), a web page, or the like, that may be provided to the client device. The interface may enable entry of such non-802.1X authentication inputs as a user name/password, a digital certificate, a token, or the like.

Processing then continues to decision block 514, where a determination is made whether the client is successfully authenticated using the non-802.1X authentication mechanism. If the client is authenticated successfully, processing continues to block 518 where the enforcer may enable the client device to access more resources or different resources based on a second policy. In one embodiment, the switch port associated with the client device may be switched to a corporate VLAN to enable the access to the other resources, or enable access to another set of resources within the guest VLAN, or the like. Processing then continues to a calling process.

If, at decision block 514, the client is not successfully authenticated with the non-802.1X authentication mechanism, then processing may continue to a calling process. In another embodiment (not shown), processing may loop back to decision block 514, where the client is allowed to make another attempt to connect using a non-802.1X authentication mechanism.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. One or more non-transitory, computer readable media, the computer readable media comprising code for execution that, when executed, causes one or more processors to:
   detect a request to join a network from a client device at a network device;
   initiate a backoff timer with a backoff time-limit based on the request to join the network; and
   apply a first policy to grant access to a network resource associated with a local area network based on determining the client device is capable of supporting an 802.1X authentication protocol before the backoff timer expires and on the client device being authenticated according to the 802.1X authentication protocol, wherein
   a second policy is applied based, at least in part, on a determination that the client device is incapable of supporting the 802.1X authentication protocol and on the client device being authenticated according to another authentication protocol.

2. The one or more media of claim 1, wherein the code for execution, when executed, causes the one or more processors to:
   disable the backoff timer based on determining the client device is capable of supporting the 802.1X authentication protocol before the backoff time-limit expires.

3. The one or more media of claim 1, wherein the client device is determined to be capable of supporting the 802.1X authentication protocol based on receiving an 802.1X authentication request before the backoff time-limit expires.

4. The one or more media of claim 1, wherein the determination that the client device is incapable of supporting the 802.1X authentication protocol is made based on the backoff time-limit expiring without the network device receiving an authentication request according to the 802.1X authentication protocol.

5. The one or more media of claim 1, wherein the determination that the client device is incapable of supporting the 802.1X authentication protocol is made based on detecting one or more failure conditions.

6. The one or more media of claim 5, wherein the one or more failure conditions is selected from a group of failure conditions consisting of an incorrect authentication credential, an improperly configured supplicant, and an inoperable network device.

7. The one or more media of claim 1, wherein the code for execution, when executed, causes the one or more processors to:
   based on the determination that the client device is incapable of supporting the 802.1X authentication protocol, configure the network device to allow the client device to access quarantined resources on a different local area network.

8. The one or more media of claim 1, wherein the code for execution, when executed, causes the one or more processors to:
   based on the determination that the client device is incapable of supporting the 802.1X authentication protocol, configure the network device to block the client device from accessing any resources in the network.

9. The one or more media of claim 1, wherein the second policy is applied to allow the client device to access one or more different network resources in the network.

10. The one or more media of claim 1, wherein the code for execution, when executed, causes the one or more processors to:
enable, prior to the request to join the network being detected, the network device to detect an 802.1X authentication request.

11. The one or more media of claim 1, wherein the code for execution, when executed, causes the one or more processors to:
disable the network device from using the 802.1X authentication protocol based on the determination that the client device is incapable of supporting the 802.1X authentication protocol.

12. The one or more media of claim 1, wherein the local area network is virtualized.

13. The one or more media of claim 1, wherein the code for execution, when executed, causes the one or more processors to:
provide an interface to the client device if the client device is incapable of using the 802.1X authentication protocol, and the interface is to enable initiation of the other authentication protocol.

14. The one or more media of claim 1, wherein the request to join the network is detected by an enforcer component for detecting a Link Up request generated by the network device.

15. A system, comprising:
a network device to route network traffic from a client device; and
an enforcer element comprising instructions executable by at least one processor to
detect a request to join a network from a client device;
initiate a backoff timer with a backoff time-limit based on the request to join the network; and
apply a first policy to grant access to a network resource associated with a local area network based on determining the client device is capable of supporting an 802.1X authentication protocol before the backoff timer expires and on the client device being authenticated according to the 802.1X authentication protocol, wherein
a second policy is applied based, at least in part, on a determination that the client device is incapable of supporting the 802.1X authentication protocol and on the client device being authenticated according to another authentication protocol.

16. The system of claim 15, wherein the instructions of the enforcer element are executable by the at least one processor to:
enable, prior to the request to join the network being detected, the network device to detect an 802.1X authentication request.

17. The system of claim 15, wherein the instructions of the enforcer element are executable by the at least one processor to:
direct the network device to route network traffic from the client device to the enforcer element.

18. The system of claim 15, wherein, if the client device is determined to be incapable of supporting authentication according to the 802.1X authentication protocol, then hypertext transfer protocol (HTTP) packets associated with the client device are permitted to propagate through the network device.

19. An apparatus, comprising:
a memory element for storing code; and
at least one processor configured to execute instructions associated with the code to:
detect a request to join a network from a client device to a network device associated with the network;
initiate a backoff timer with a backoff time-limit based on the request to join the network; and
apply a first policy to grant access to a network resource associated with a local area network based on determining the client device is capable of supporting a an 802.1X authentication protocol before the backoff timer expires and on the client device being authenticated according to the 802.1X authentication protocol, wherein
a second policy is applied based, at least in part, on a determination that the client device is incapable of supporting the 802.1X authentication protocol and on the client device being authenticated according to another authentication protocol.

20. The apparatus of claim 19, wherein the backoff time-limit is set to a value based on at least one of characteristics of the network or characteristics of the network device.

21. A method, comprising:
detecting a request to join a network from a client device at a network device;
initiating a backoff timer with a backoff time-limit based on the request to join the network; and
applying a first policy to grant access to a network resource associated with a local area network based on determining the client device is capable of supporting an 802.1X authentication protocol before the backoff timer expires and on the client device being authenticated according to the 802.1X authentication protocol, wherein
a second policy is applied based, at least in part, on a determination that the client device is incapable of supporting the 802.1X authentication protocol and on the client device being authenticated according to another authentication protocol.

22. The method of claim 21, further comprising:
disabling 802.1X processing on a switch port, on the client device not successfully authenticating using the 802.1X authentication protocol.

* * * * *

UNITED STATES PATENT AND TRADEMARK OFFICE
CERTIFICATE OF CORRECTION

PATENT NO. : 10,110,638 B2
APPLICATION NO. : 15/186084
DATED : October 23, 2018
INVENTOR(S) : Alexandru Z. Vank et al.

Page 1 of 1

It is certified that error appears in the above-identified patent and that said Letters Patent is hereby corrected as shown below:

In the Specification

Column 1, Line 29, delete "Switch," and insert -- Switch,". --, therefor.

Signed and Sealed this
Twenty-ninth Day of January, 2019

Andrei Iancu
*Director of the United States Patent and Trademark Office*